(12) United States Patent
Carli et al.

(10) Patent No.: US 12,514,362 B2
(45) Date of Patent: Jan. 6, 2026

(54) DEVICE FOR REMOVAL OF BACTERIA AND BIOFILMS FROM SURFACES OF IMPLANTABLE MEDICAL DEVICES AS WELL AS FROM THE SURGICAL SITE

(71) Applicant: New York Society for the Relief of the Ruptured and Crippled, maintaining the Hospital for Special Surgery, New York, NY (US)

(72) Inventors: Alberto Carli, New York, NY (US); Kelly Stelmaszczyk, New York, NY (US)

(73) Assignee: New York Society for the Relief of the Ruptured and Crippled, maintaining the Hospital for Special Surgery, New York, NY (US)

( * ) Notice: Subject to any disclaimer, the term of this patent is extended or adjusted under 35 U.S.C. 154(b) by 0 days.

(21) Appl. No.: 18/025,305

(22) PCT Filed: Sep. 24, 2021

(86) PCT No.: PCT/US2021/051918
§ 371 (c)(1),
(2) Date: Mar. 8, 2023

(87) PCT Pub. No.: WO2022/067014
PCT Pub. Date: Mar. 31, 2022

(65) Prior Publication Data
US 2023/0320479 A1   Oct. 12, 2023

Related U.S. Application Data

(60) Provisional application No. 63/082,917, filed on Sep. 24, 2020.

(51) Int. Cl.
*A46B 13/04* (2006.01)
*A46B 11/06* (2006.01)
(Continued)

(52) U.S. Cl.
CPC ............ *A46B 13/04* (2013.01); *A46B 11/063* (2013.01); *A46B 13/023* (2013.01);
(Continued)

(58) Field of Classification Search
CPC ....... A46B 13/02; A46B 13/04; A46B 13/023; A46B 13/00; A46B 11/06; A46B 11/063;
(Continued)

(56) References Cited

U.S. PATENT DOCUMENTS 5,465,450 A * 11/1995 Humphries .......... A46B 5/0079
15/201
5,653,591 A * 8/1997 Loge ...................... A61C 17/20
433/118
(Continued)

FOREIGN PATENT DOCUMENTS

CN   207411768   5/2018
WO   2011019788   2/2011
(Continued)

OTHER PUBLICATIONS

Computer generated English translation of WO 2018/079913 A1, Sohn, May 3, 2018. (Year: 2018).*

(Continued)

*Primary Examiner* — Laura C Guidotti
(74) *Attorney, Agent, or Firm* — Leason Ellis LLP

(57) ABSTRACT

A method for cleaning a surface that is selected from at least one of a medical device surface and a soft tissue surface includes the steps of: contacting the surface with bristles of a moving brush head that is part of a powered hand-held device; and dispensing onto the surface an irrigation fluid through the brush head and a dispensing opening formed along the brush head.

32 Claims, 12 Drawing Sheets

(51) Int. Cl.
*A46B 13/02* (2006.01)
*A46B 15/00* (2006.01)
*A61B 90/70* (2016.01)
*A61B 17/32* (2006.01)

(52) U.S. Cl.
CPC ...... *A46B 15/0004* (2013.01); *A46B 15/0034* (2013.01); *A61B 90/70* (2016.02); *A46B 2200/1006* (2013.01); *A46B 2200/3073* (2013.01); *A61B 2017/320012* (2013.01)

(58) Field of Classification Search
CPC ........ A46B 2200/1006; A46B 15/0036; A61L 2/26; A61M 3/02; A61C 17/0202; A61C 17/024; A61C 17/36; A61C 17/228; A61B 90/70; A61B 2017/320012
See application file for complete search history.

(56) References Cited

U.S. PATENT DOCUMENTS

| | | | |
|---|---|---|---|
| 6,374,448 B2 * | 4/2002 | Seifert | A46B 7/08 15/176.4 |
| 8,317,424 B2 * | 11/2012 | Chenvainu | A61C 17/36 433/80 |
| 9,681,744 B2 * | 6/2017 | Russell | A61C 17/34 |
| 10,368,968 B2 * | 8/2019 | Reizenson | A61B 5/14507 |
| 2004/0045107 A1 | 3/2004 | Egeresi | |
| 2008/0209650 A1 | 9/2008 | Brewer et al. | |
| 2016/0135581 A1 | 5/2016 | Pai | |
| 2017/0367471 A1 * | 12/2017 | Straka | A46B 15/0044 |
| 2019/0247172 A1 | 8/2019 | Sohn | |
| 2021/0227952 A1 * | 7/2021 | Stiehl | A46B 5/0095 |
| 2023/0031223 A1 * | 2/2023 | Vogt | B08B 1/12 |
| 2024/0260739 A1 * | 8/2024 | Vogt | A61C 17/0208 |
| 2024/0269713 A1 * | 8/2024 | McManus | B08B 7/0071 |

FOREIGN PATENT DOCUMENTS

| | | | |
|---|---|---|---|
| WO | WO 2016034888 A1 * | 3/2016 | ............ A46B 10/02 |
| WO | 2018079913 | 5/2018 | |

OTHER PUBLICATIONS

European Search Report in EP Application No. 21873499.4-1113/4216760, mailed Sep. 16, 2024 (6 pages).

International Search Report and Written Opinion in PCT/US2021/051918, mailed Apr. 3, 2022 (18 pages).

* cited by examiner

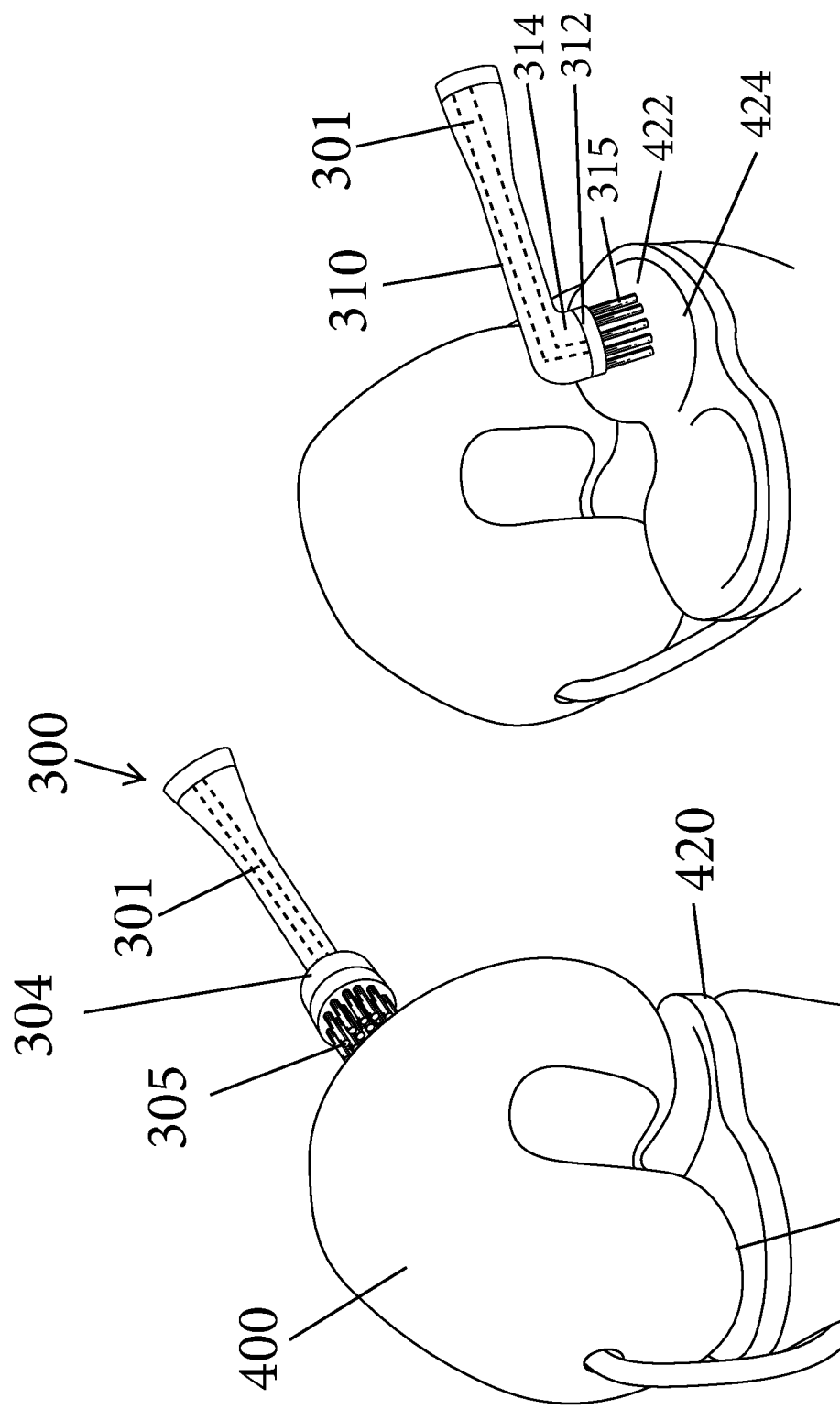

DEVICE FOR REMOVAL OF BACTERIA AND BIOFILMS FROM SURFACES OF IMPLANTABLE MEDICAL DEVICES AS WELL AS FROM THE SURGICAL SITE

CROSS-REFERENCE TO RELATED APPLICATION

The present application is a U.S. National Phase Application under 35 U.S.C. § 371 of International Patent Application No. PCT/US2021/051918, filed Sep. 24, 2021, which claims priority to and the benefit of U.S. patent application Ser. No. 63/082,917, filed Sep. 24, 2020, all of which are hereby expressly incorporated by reference in its entirety.

TECHNICAL FIELD

The present invention is directed to the field of bacteria and biofilm removal and more particularly, to a device in brush form, that is configured to remove bacteria and biofilm from an implantable medical device, such as a surgical implant, as well as, bone, muscle, fascia and internal surgical tissue that resides at the surgical site.

BACKGROUND

Surgical site infection (SSI) is a devastating complication that can occur following urgent or elective surgery, often requiring the need for morbid revision surgery to occur. A principle reason for why infections can persist at surgical sites is the ability for pathogens (e.g., bacteria and/or fungi) to adhere to medical devices, implants, meshes and sutures, and then form a biofilm that permits pathogens to proliferate while protecting them from the immune system, antimicrobial medications and direct surgical irrigation. Implantable medical devices (e.g., orthopedic implants, pacemakers, spine stimulators), meshes and sutures have complex geometries that can permit bacteria to form biofilm in small recesses and pockets.

Effectively disrupting biofilm, killing microorganisms and leaving any survivors in a planktonic (non-biofilm) state which renders them vulnerable to the immune system and antimicrobials, is known to be the fundamental process required to cure SSI. Clear precedent for the importance of mechanically removing biofilm exists in both the dental and orthopedic fields, where effective biofilm removal using cleaning products leads to good dental health and the prevention of orthopedic implant infections.

In the event that biofilm cannot be effectively removed from a medical device, surgeons are often forced to remove the device in order to eliminate the source of microorganisms and cure SSI. Removing medical devices in fields such as orthopedic surgery (plates, screws, joint replacements), cardiac surgery (valves) and general surgery (meshes, internal staples) often requires morbid surgical procedures in which bone, muscle or soft tissue surrounding the infected device is also removed. These procedures can be functionally devastating for patients and are associated with high risks of significant blood loss, long-term disability, and even death.

When treating SSI, surgeons currently have inadequate tools which cannot effectively mechanically dislodge and disrupt biofilm that has formed on the surfaces of medical implants and adjacent host tissues. Surgeons can currently: (1) irrigate the surfaces (either using gravity flow tubing or through various pressurized systems) and/or (2) submerge the wound in antiseptic solutions of varying concentrations and/or (3) use fragile sponges or toilet-brush-type devices to mechanically disturb biofilm. Unfortunately, irrigation methods have been shown to incompletely remove biofilm and can spread microorganisms deeper into surrounding healthy tissues. Furthermore, antiseptic solutions are often cytotoxic to surrounding healthy tissues, do not effectively penetrate biofilm, and are generally not FDA approved for internal use. Finally, sponges or toilet-brush-type devices are too fragile to utilize against implants or medical devices, can break apart with use (leaving possibly toxic fragments within healthy tissues) and, like antiseptics, are not FDA approved for use inside the body. They also are too large and bulky, and therefore cannot effectively navigate the complex geometry of medical devices to effectively disrupt biofilm.

Although brushes currently exist in the medical marketplace, they suffer from a number of deficiencies. More specifically, these brushes, termed "scrub brushes" have uniquely been designed for use outside of the body, specifically to clean the hands of health-care workers. These brushes are too bulky to apply onto medical devices, have course bristles than can damage medical devices or fragile internal tissues, and are not FDA approved for internal use as they are not adequately sterile. To summarize, there is a void in the marketplace of a brush which a) has been specifically designed for use inside surgical wounds, and b) has been designed to delicately, but effectively remove biofilm from the complex surfaces of medical implants without altering their surface architecture. If surgeons had access to an effective tool which could remove biofilm from medical devices and surrounding tissues, then these devices could be left intact, avoiding invasive device removal and consequently decreasing the morbidity and mortality of SSI to patients. Such an innovation could lead to a significant cost savings to society.

SUMMARY

According to one embodiment, a powered hand-held device for cleaning bacteria and biofilm from a surface includes a handle having a distal end and a brush head that can be detachably coupled to the distal end of the handle. The brush head can have a movable bristle plate from which a plurality of bristles extend outwardly. The hand-held device has at least a first operating mode and a second operating mode, wherein in one exemplary first operating mode, the movable bristle plate oscillates between 7,000 and 36,000 oscillations per minute, wherein in one exemplary second operating mode, the movable bristle plate moves (sonicates) at a minimal rate of 20,000 Hertz (20 kHz), and up to 20,000,000 Hertz (20 MHz). Each operating mode can be further distinguished into at two or more operating speeds, with varying oscillations or movements per minute. These operating speeds are designed for different contact surfaces—delicate tissue (skin, subcutaneous tissue), firm tissue (scarred subcutaneous tissue, muscle, bone) and implant surfaces.

A method for cleaning a surface that is selected from at least one of a medical device surface and a soft tissue surface includes the steps of: contacting the surface with bristles of a moving brush head that is part of a powered hand-held device; and dispensing onto the surface an irrigation fluid through the brush head and a dispensing opening formed along the brush head.

BRIEF DESCRIPTION OF DRAWING FIGURES

FIGS. 4A-4E illustrate exemplary detachable brush heads for attachment to a handle of the system;

DETAILED DESCRIPTION OF CERTAIN EMBODIMENTS

As described herein, devices (instruments or tools) are provided for removing necrotic tissue, bacteria and/or biofilms from objects, such as medical devices, as well as from skin, soft tissue, bone, muscle and internal surgical tissue that is located at a surgical site. As previously mentioned, surgical site infection is of utmost concern and can be caused by bacteria being present on medical devices, including orthopedic implants, as well as surgical accessories, such as meshes and sutures, that are used during the surgical procedure.

Biofilm

Biofilm is composed of microorganisms, such as bacteria and fungi, which form an extracellular polysaccharide and protein-based matrix that protects them and permits them to proliferate. Organisms living within biofilm have heterogenous metabolic states that fulfill the needs of the community, including some which remain quiescent and therefore are very resistant to external threats, while others proliferate constantly, secreting more extracellular matrix and helping the biofilm expand in size. The process of biofilm formation begins with microorganism surface proteins adhering to a compatible surface (organic or non-organic) in the presence of a moist environment. Following activation of biofilm generating loci with the microorganism's DNA, extracellular matrix production ensues, leading to the surrounding surface becoming covered in a sticky 'slime-like' substance. This matrix accelerates adherence by other microorganisms in the area to the surface, protects the organisms from being detected and phagocytosed by mammalian cells (such as immune cells found in large animals and humans) and even protects the organisms from being removed from the surface through physical (cleaning) or chemical (antiseptics, antibiotics) means.

Microorganisms can form biofilm on organic surfaces (plant surfaces, human and animal tissue) as well as a multitude of inorganic surfaces (metals, plastics, stone). Through this mechanism, microorganisms form biofilm on objects which humans regularly interact with (kitchen countertops, doorhandles, toilet seats, and medical implants), leading to medical illness. While it is possible for a biofilm community to be uniquely comprised of a single genus of microorganism, it is naturally more common to externally encounter biofilms that consist of a mixture of species of bacteria, as well as fungi, algae, yeasts, protozoa, and other microorganisms, along with non-living debris and corrosion products.

System (Device) for Removing Bacteria and Biofilms

Figure 1:
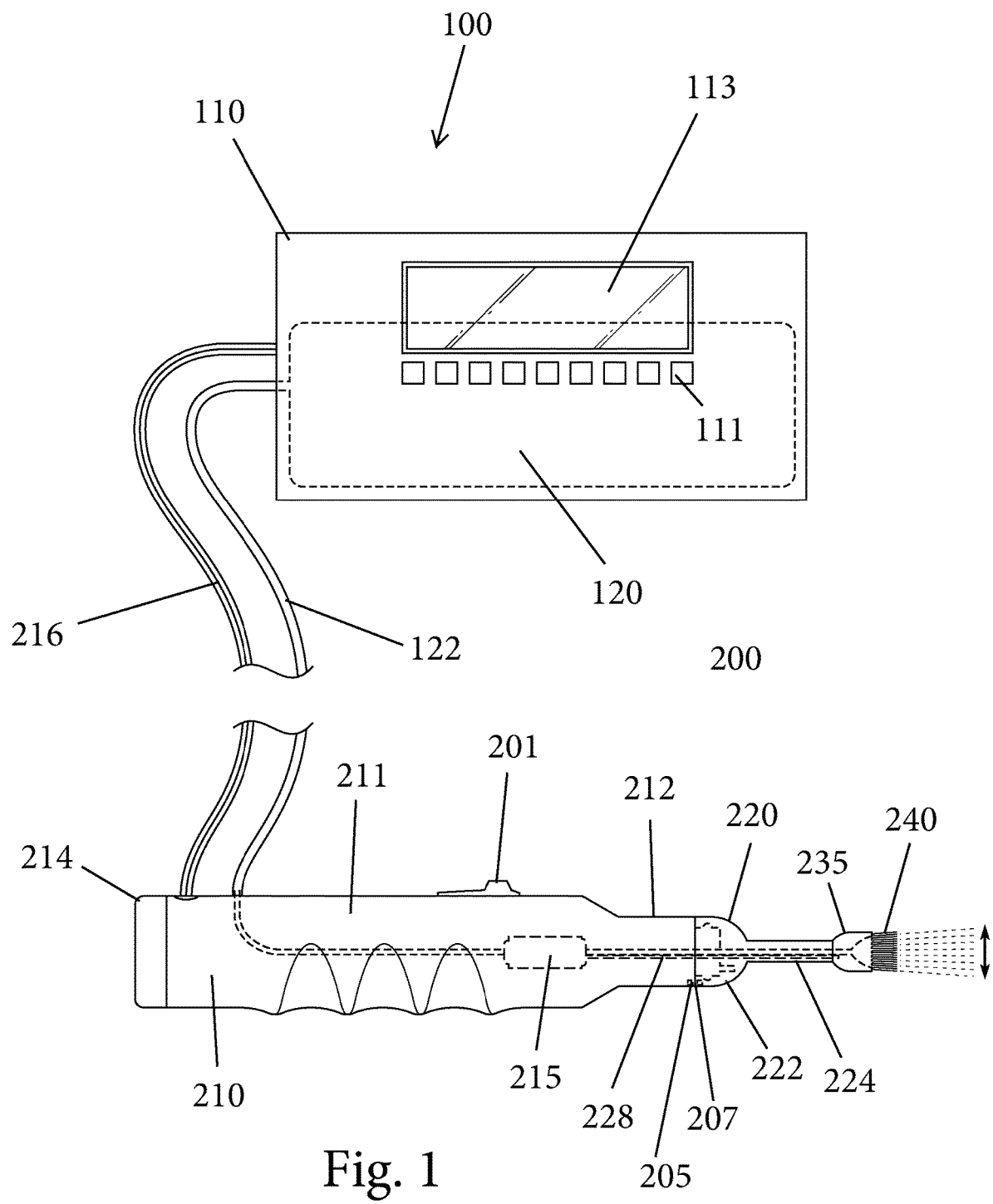
FIG. 1 is a partial cross-sectional view of a system for removing bacteria and/or biofilm from an object in accordance with a first embodiment.

FIG. 1 is a schematic illustrating an exemplary system 100 according to a first embodiment that is designed for removing bacteria and/or biofilms from a target surface. The system 100 is intended for use in a sterile surgical environment (such as an operating room) and thus meet the strict safety standards that are in place within such room. Specifically, the World Health Organization highly recommends that using sterile surgical instruments is a critical component of performing safe surgery. Spaulding in 1970 classified any equipment or device that is designed to enter sterile tissues as being required to undergo 'critical' evaluation for cleaning followed by sterilization prior to use. In addition to decontaminating reusable instruments, single-use disposable instruments/devices are an attractive alternative due to their extremely low contamination risk and avoidance of expensive hospital labor and sterilization costs. Although designed for sterile operating room use, the device may also be utilized in a sub-sterile environment, such as debriding open external wounds or sensitive tissues.

The materials and components described herein are therefore compatible with different types of sterilization processes, including but not limited to the use of an ethylene oxide bath.

The system 100 includes at least one surgical brush 200 each of which is configured to not only clean the surfaces of one or more medical devices (made of a metal alloy or plastic), such as an orthopedic implant/spinal stimulator/pacemaker, but also is configured to clean bone, muscle, fascia, subcutaneous tissue, skin and internal surgical tissue at the surgical site. As described herein, a plurality of surgical brushes 200 can be provided in the form of a kit. The surgical brush 200 is preferably a hand-held device and, at least according to one embodiment shown in FIG. 1, can be operatively coupled to a console 110. The console 110 can include various connections as well as controls that concern the operation of the surgical brush 200 when the surgical brush is of an automated type. It will be appreciated that the console 110 can be eliminated and, as discussed herein, the surgical brush 200 can be of a standalone hand-held unit that does not need to be connected to a console 110.

It will also be appreciated that the brush 200 itself can contain connections and controls that allow for control over the operation of the brush 200 as discussed below. For example, the handle of the brush 200 can include power controls 201 that control the speed at which the brush operates (e.g., HI, MED, and LOW settings) and can also contain controls that allow the user to select between different operating modes, such as an optional irrigation and aspiration mode, etc. Accordingly, and optionally, the system 100 can thus include a source of irrigation fluid 120 as well as a device that is configured to generate negative pressure that is used to aspirate fluid from the surgical site.

Surgical Brush (FIG. 1)

Broadly speaking, the present disclosure, at least in one implementation, is directed to a kit of surgical brushes that are specifically configured for use in the target environment of a surgical site. As described herein, the surgical brushes are configured to clean various surface that potentially contain bacteria and/or biofilms. Before the surgical procedure is completed, the various target surfaces can be effectively cleaned using the selected surgical brush.

The surgical brush 200 is generally formed of two parts, namely, a handle 210 and a detachable head portion 220.

Handle 210

The handle 210 can be thought of as a base unit to which a selected head portion 220 can be attached. The handle 210 is an elongated structure that has a distal end 212 and an opposing proximal end 214. The handle 210 is configured to be held in the hand of the user. The detachable head portion 220 is coupled to the distal end 212 of the handle 210.

The handle 210 has an outer housing 211 and a hollow interior in which certain operable parts are contained. For example, inside of the outer housing 211, the handle 210 includes electric components, such as a motor 215, that are powered by a power source 216. As described herein, operation of the motor 215 imparts movement to the head portion 220. The motor 215 can be a servo motor or the like. The motor 215 has a drive shaft that is powered by the motor 215. As described herein, the motor 215 can be operatively coupled to the head portion 220 using a linkage or the like that translates rotation of the motor 215 into the oscillation movement in the head portion 220.

Head Portion 220

The head portion 220 includes a body 222 that has a neck portion 224 and a bristle portion. In FIG. 1, the head portion 220 is of a 0-degree type in that there is no angle of inclination of the bristle portion relative to the longitudinal axis of the handle and the body 222. The proximal end 221 of the body 222 that attaches to the distal end 212 of the handle 210 preferably has a width that is substantially the same as the width of the distal end 212. The neck portion 224 can have a narrower width than the proximal end of the body 222. At an opposite distal end of the body 222, the head portion 220 has a (semi-rotating) bristle portion defined by a plurality of bristles 240 that are attached to a movable bristle plate 235. As described herein, the plurality of bristles 240 can be formed in a specific bristle pattern. It is the bristle plate 235 that is movable and is driven by the motor 215. When the surgical device is of an oscillation type, it is the bristle plate 235 that oscillates and similarly, when the surgical device is of a rotating type, it is the bristle plate 235 that rotates.

The body 222 of the head portion 220 does not move (i.e., does not oscillate or rotate) but rather is removably attached to the handle 210 in a fixed (stationary) manner. The action of the head portion 220 thus lies with the movable bristle plate 235.

The body 222 is typically formed of a rigid plastic material, while the bristles 240 are formed of suitable bristle material (e.g., polymeric material (e.g., nylon)). As described herein, different bristle types can be used depending upon the intended use of the surgical brush 220. For example, bristles 240 that are intended for cleaning of the soft tissue at the surgical site can be formed of a softer, less dense material and can have a first length. Conversely, bristles 240 that are intended for cleaning of the harder surfaces, such as an implant, can be formed of a firmer material and can have a second length that is less than the first length.

It will also be appreciated that exemplary bristle patterns can include two different types of bristles. For example, bristles formed of two different types of materials can be used as part of the bristle portion. In addition, bristles having other different characteristics can be provided on a single bristle plate 235.

As described below, the system 100 can be in the form of a kit that includes multiple different head portions 220 that can be used with the handle 210 in an interchangeable manner Movable Head Portion 220

In accordance with the present disclosure, one or more of the surgical brushes disclosed herein can be automated such that at least a head portion thereof that includes bristles is movable in a controlled manner. For example, and as mentioned herein, the bristle portion (bristles 240) can oscillate or sonicate under action of the motor 215.

As is known, an oscillation movement is a back and forth movement. In the case of the bristle portion, the oscillation can take at least two different motions. A first oscillation motion is one in which the bristle portion moves side-to-side (a twisting motion), while a second oscillation motion is one in which the bristle portion moves forward and backwards. In this second oscillation motion, the bristle portion moves in a direction away from the handle 210 (forward) and then in an opposite direction toward the handle 220 (backward).

As is also known, sonication is the act of applying sound energy to agitate particles in a sample or object.

Both the handle 210 and the detachable head portion 220 contain operative parts that are configured to transfer the motion generated within the handle 210 into a motion of bristle portion of the detachable head portion. In one embodiment, the head portion 220 can contain a cam and gear unit that converts the high-speed rotary (spinning) motion of an electric motor contained in the handle into reciprocating (back-and-forth) brushing motion or oscillating (sonication) motions for cleaning the target surface. The cam and gear mechanism is generally indicated at 228 in the figure. The cam and gear works generally in the following manner. The motor that is contained in the handle housing always rotates in the same direction at high speed and the cam and crank that is part of the detachable head portion coverts the rotation into a lower-speed, back-and-forth vibration. In particular, as the cam turns, the crank pulls first one way and then the other, thereby moving the brush head portion rapidly from side-to-side.

The cam and gear unit is connected to a gear built into the top of the motor 215, so the motor drives it directly. The motor 215 is connected to a power source that can be either a rechargeable battery that is contained within the handle housing or it can be a power cord that is connected to a traditional electric wall outlet. Within the handle housing is also a conventional electric circuit board that controls the actuator/controls 201 (e.g., a switch, etc.) that is located along the handle housing. Exemplary controls located along the handle housing are described herein and not only include on/off functionality but also contain selected modes of operation (e.g., different speeds of the motor, different motions, etc.).

In another embodiment, a cam and gear mechanism can be contained within the handle 210 and when the removable head portion 220 is removed, the user sees an exposed end of the drive shaft or an exposed end of a connector shaft that is received within the hollow space of the body 222 of the head portion 220. This exposed shaft which can appear as a metal post can move in a reciprocating movement (oscillating) and it is directly connected to an internal mechanism within the body 222 of the head portion 220 that is connected to the movable bristle portion 230 for causing the desired movement of the bristle portion 230.

The housing of the handle 210 is typically formed of a rigid plastic material and the controls can be formed of an elastomeric material, such as rubber, etc.

Rotating Head Portion 220

In another embodiment, the head portion 220 is designed to rotate under action of the motor 215. For example, in the embodiment of FIG. 1, the head portion 220 is connected to the rotating drive shaft and therefore, rotation of the drive shaft is translated into rotation of the head portion 220 and therefore, the bristles 240 likewise rotate 360 degrees, thereby providing a cleaning action.

The drive shaft of the motor 215 that extends distal to the distal end 212 of the handle 210 can be received within a hollow interior of the proximal portion of the head portion 220. For example, a friction fit can be established between the drive shaft and the head portion 220. The interface between the head portion 220 and the distal end of the handle 210 is of a sealed nature and is of a type that allows the oscillation of the drive shaft.

Irrigation and/or Aspiration Functionalities

In one embodiment, the surgical brush can include an irrigation feature and can further optionally include an aspiration feature. As is known, irrigation involves delivery of a fluid, such as a sterile saline solution and a diluted antiseptic, to wash out the surgical site to help prevent surgical site infection (SSI).

The irrigation fluid can be delivered in any number of different ways; however, typically, the irrigation fluid is carried in a conduit that is open at a dispensing opening through which the irrigation fluid is delivered to the surgical site. For example, as described herein, an irrigation conduit can be routed through the handle housing. One end of the conduit is connected to a source of irrigation fluid and the other end defines the dispensing opening. When the console 110 is provided, the irrigation conduit can be fluidly connected to the console 110 as by tubing 122 or the like. One or more of the console 110 and the handle housing can contain controls for controlling delivery of the irrigation fluid. For example, the handle housing can contain controls 201 that can be an on/off switch for delivery of the irrigation fluid and flow settings, such as high flow and low flow. The console 110 can include controls 111 and can include a display 113.

The irrigation fluid feature can thus include a first pump that operates to pump the irrigation fluid to the dispensing opening.

With respect to the aspiration feature, the handle housing can contain an aspiration conduit that is operatively connected to a negative pressure (suction) source. For example, a suction source, such as a second pump, can be provided for generating negative pressure within the aspiration conduit.

Controls 111, 201 can be provided at the console and/or the handle housing for controlling operation of the aspiration feature.

One selectable operation mode that can be selected with controls at the console 110 and/or along the handle housing is a pulse mode in which the irrigation fluid is delivered in a pulsed manner and during an off cycle of irrigation fluid delivery, negative pressure is applied for aspirating the irrigation fluid.

Figure 2:
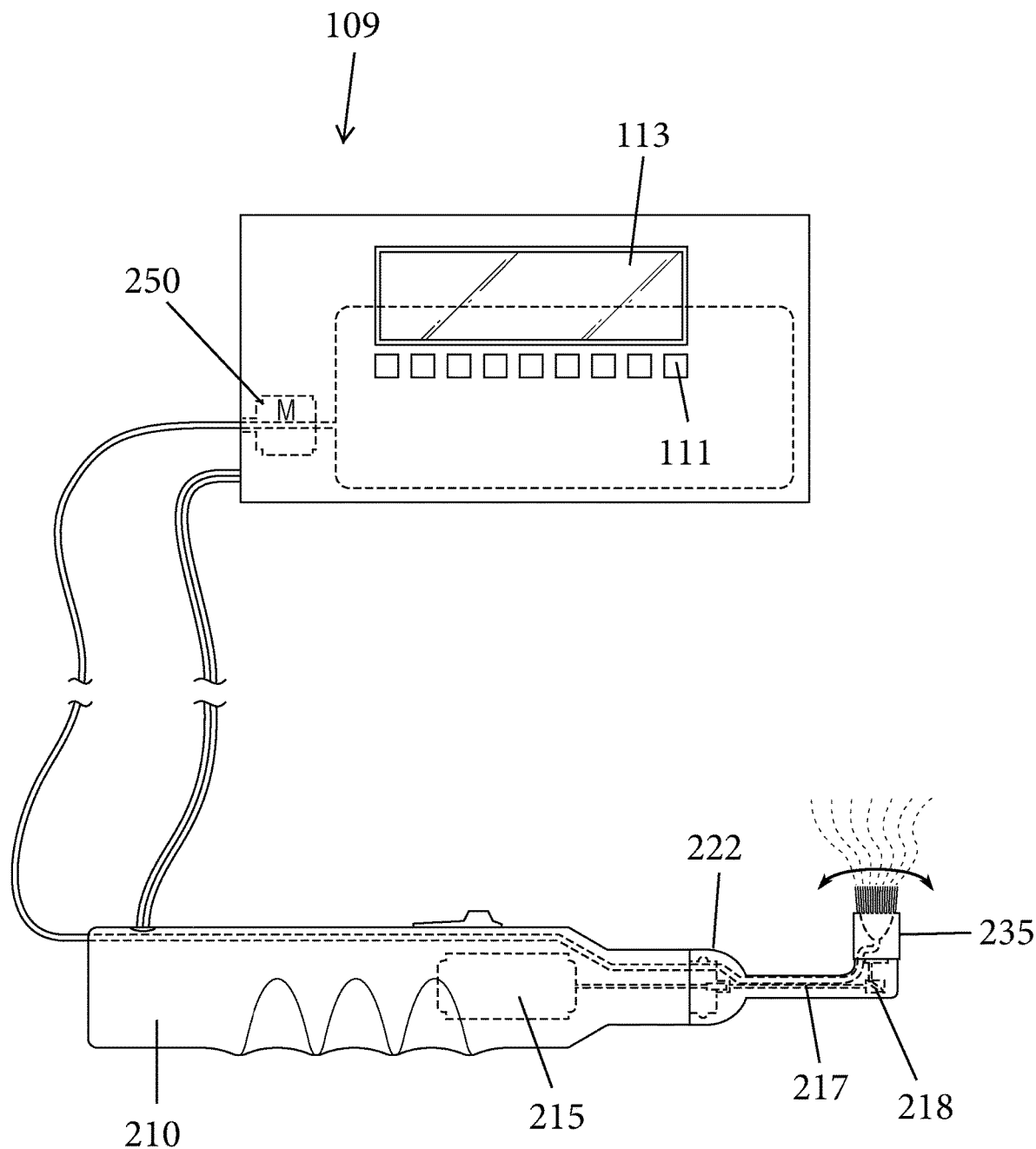
FIG. 2 is a partial cross-sectional view of a system for removing bacteria and/or biofilm from an object in accordance with a second embodiment.
Figure 3:
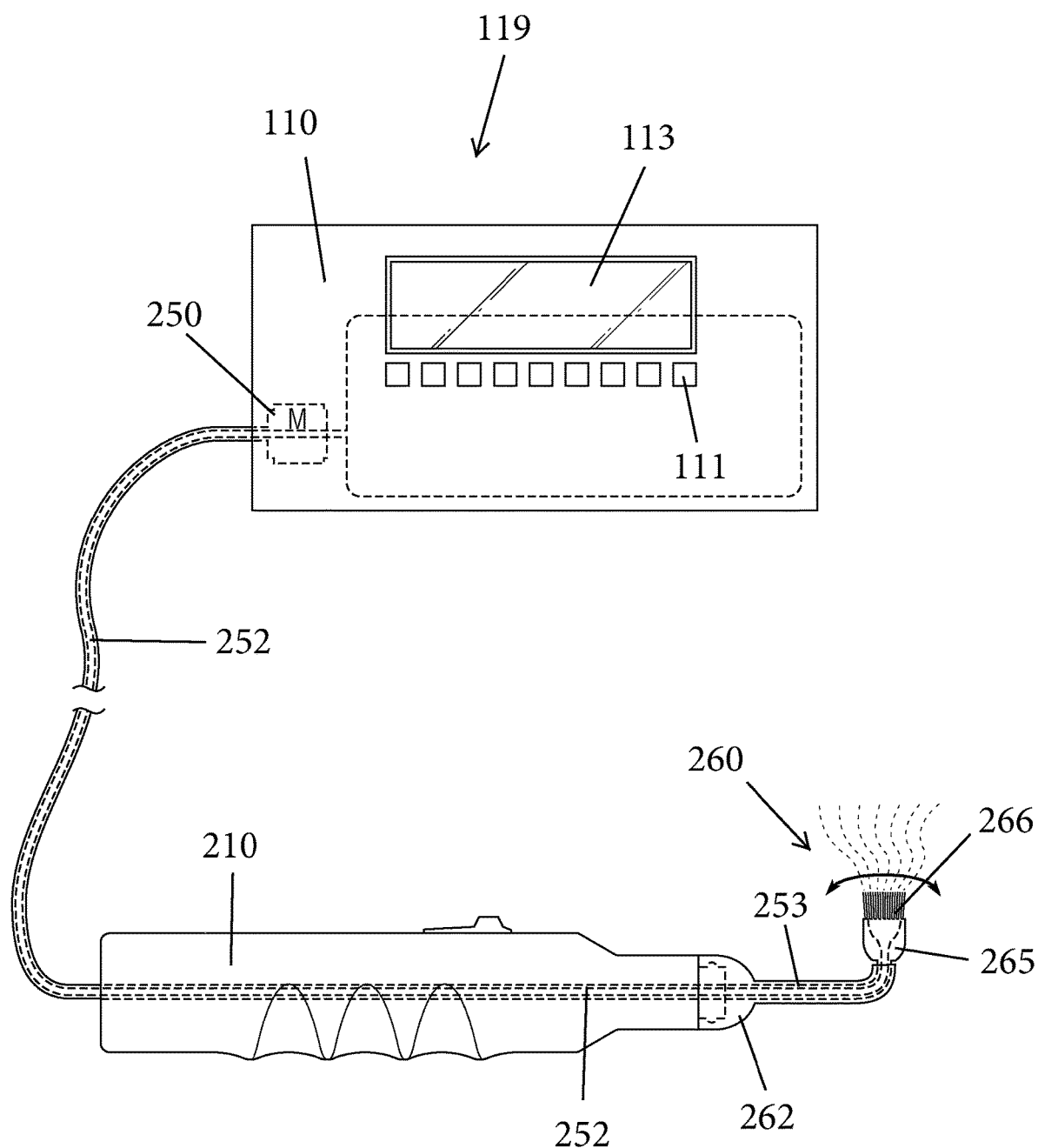
FIG. 3 is a partial cross-sectional view of a system for removing bacteria and/or biofilm from an object in accordance with a third embodiment.

In FIGS. 1-3, the dashed lines emanating from the brush head depict an exemplary spray pattern.

In terms of the head of the surgical brush, the dispensing opening can be located and open along a bristle face and the aspiration opening is likewise located along the bristle face. The two openings can be located side-by-side or otherwise arranged.

In one embodiment, one or more of the bristles can serve as part of the irrigation pathway in that the bristle can be a flexible hollow structure that is in fluid communication with the irrigation conduit in the detachable head portion and in the handle housing. Similarly, one or more of the bristles can serve as part of the aspiration pathway in the bristle can be a flexible hollow structure that is in fluid communication with the aspiration conduit for aspirating fluid (e.g., the dispensed irrigation fluid) that is present at the surgical site.

Control Settings

As mentioned herein, there are a number of controls 111, 201 that can be provided as part of the console 110 and/or the handle housing for controlling operation of the surgical brush 200.

Device Settings

The surgical brush 200 preferably has at least two device settings that concern the method of movement of the head portion: an oscillating (back and forth) movement, and a sonication (vibration) movement. Both methods have been shown to be effective in removing necrotic tissue and bacteria/biofilm from organic and inorganic surfaces. Within each movement setting, there will be at least three different speed settings for specific surface types. Speeds will slightly vary depending on the amount of pressure applied to the surface by the user.

For oscillation (back-and-forth) movements, there is a low setting (e.g., 7,000 to 12,000 movements per minute) for application on delicate tissue surfaces including skin, subcutaneous fat, muscle fibers, gastrointestinal tissue, blood vessels and neural tissue. There is preferably a medium setting (e.g., 12,000 to 24,000) for application on firmer tissues including surgical scar tissue, tendons, fascia, bone and delicate medical implants (nylon, polyurethane or polyethylene surfaces). There is a e high setting (e.g., 24,000 to 36,000 movements per minute) for solid medical implants (metal alloys, hard plastics, etc.).

For sonication (vibratory movements producing high frequency waves), similar setting classifications will exist, including low (e.g., 20-200 kHz), medium (e.g., 200 kHz-11 MHz) and high (e.g., 11-20 MHz) settings for the respective surfaces. In addition to direct application to surfaces of interest, the sonication mode can also be utilized through a liquid medium. Specifically, users may fill the surgical wound with water or another sterile liquid and then the brush, on sonication setting, can be placed in the liquid and turned on, transmitting the high frequency waves to the entire wound at once, essentially replicating ultrasonic processes used to clean medical devices, but instead being performed directly inside the surgical wound.

Both oscillatory and sonication-type movements have proven to be effective in the removal of bacteria and biofilm and at specific settings (e.g., speed), the movement direction and frequency of movement of the head and bristles is safe on human tissue. However, for removal of biofilm and bacteria on hard surfaces, such as specific medical devices, a lower or different movement/frequency setting is less effective.

The user will typically select the desired setting from a button and/or switch that is located on the console 110 and/or the handle housing. For example, a single push button can be provided and the user can scroll through the various settings, including an offsetting, by successively pressing the button.

Alternatively, a touch screen display 113 can be provided at the console 110 and/or the handle housing. From the touch screen display 113, the user can select the desired oscillation setting as by use of a pull down menu or the like. When the touch screen display 113 is used, the selected settings as well as other parameters can be displayed.

Irrigation Settings

The system 100 also has controls that permit different irrigation settings to be selected. For example, there can be a low irrigation setting that is intended to be selected when the surgical brush 200 is used to clean soft tissue, such as bone, muscle, and tissue, at the surgical site. The low irrigation setting can be a setting in which the pressure of the dispensed irrigation fluid is approximately 30 psi or less. There can also be a high oscillation setting that is intended to be selected when the surgical brush 200 is used to clean hard surfaces, such as medical devices (e.g., an orthopedic implant). The medium irrigation setting can be a setting in which the pressure of the dispensed irrigation fluid is approximately 30 psi or greater. A third, very high irrigation setting can also be available, with the pressure of the dispensed irrigation fluid is 1,000 psi or greater.

Irrigation settings over 30 psi have been found to be effective in removing bacteria from metal surfaces; however, such pressure will also induce trauma to soft tissues and push bacteria deeper into tissue wounds. Bone is tougher than soft tissue and can tolerate higher irrigation pressures (e.g., 15-25 psi) while permitting effective bacterial removal. Low irrigation settings (15 psi and lower) are generally considered safe for soft-tissue use, but are less effective in removing dead and devitalized tissue. Very high pressures (over 1,000 psi) have been shown to be effective in decontaminating devitalized tissue, but require careful use to avoid iatrogenic damage to healthy tissues.

There can even be a medium irrigation setting as well in which the pressure value (e.g., 15-25 psi) is between the low setting and the high setting.

Similar to the brush speed settings, the user will typically select the desired irrigation setting from a button and/or switch that is located on the console 110 and/or the handle housing. For example, a single push button can be provided and the user can scroll through the various setting by successively pressing the button or, as mentioned, the user can make selections through a touch screen menu.

In addition, as discussed herein, the user interface at the console can provide a menu of different operating settings and can be configured, in one embodiment, to provide a menu choice of surface type to be cleaned, such as metal, plastic, bone, tissue, etc. The main controller (processor) is configured such that when the user selects one surface type to be cleaned, an algorithm is used to select the optimal operating parameters, such as brush head movement type, motor speed, and irrigation setting (psi), etc. In this way, the user can select, as by pressing a menu choice on a display screen, the desired surface type and then the system automatically configures itself for use. No additional input is required by the user.

Figure 13:
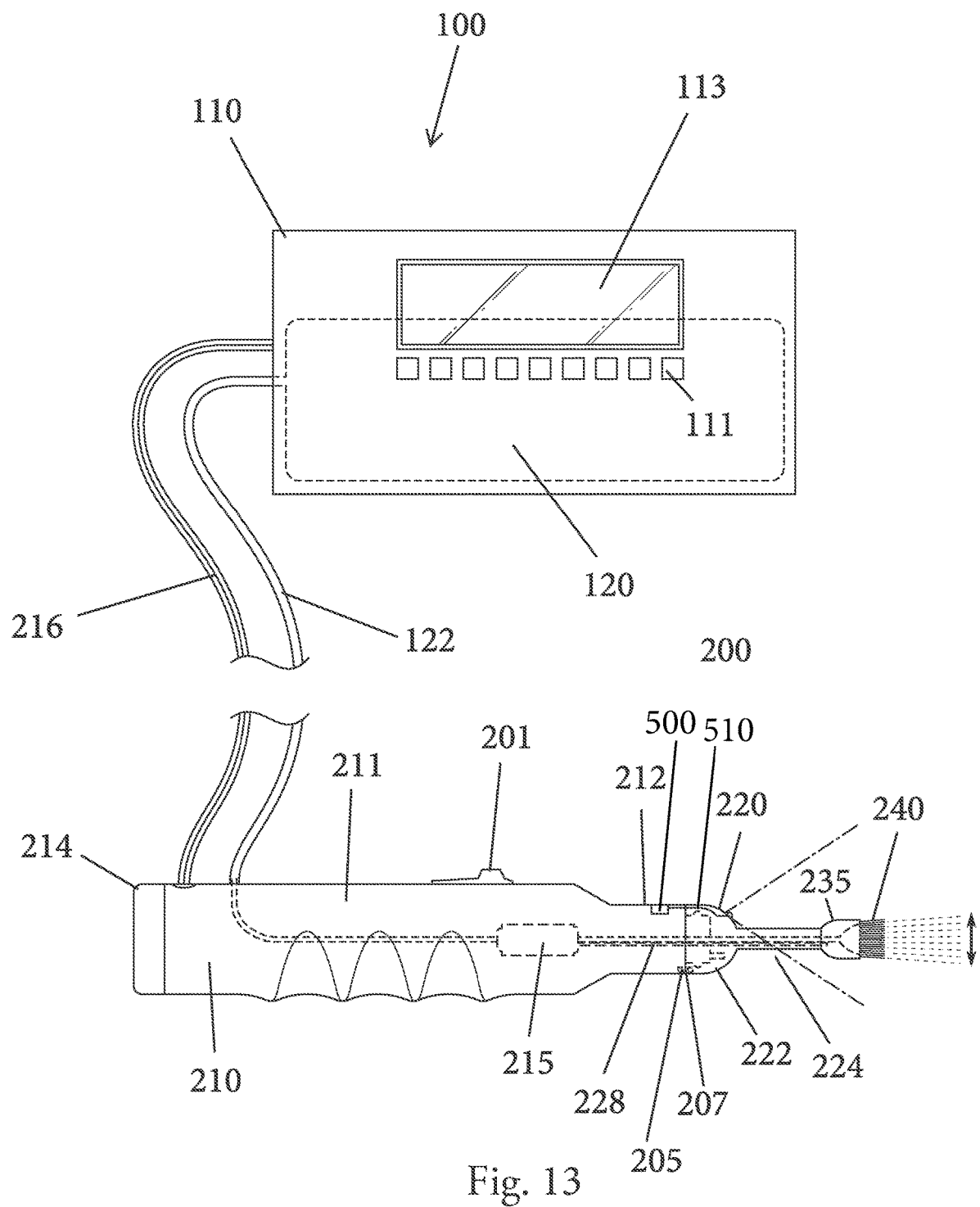
FIG. 13 illustrates the system of FIG. 1 further including an optional illumination feature.
Figure 14:
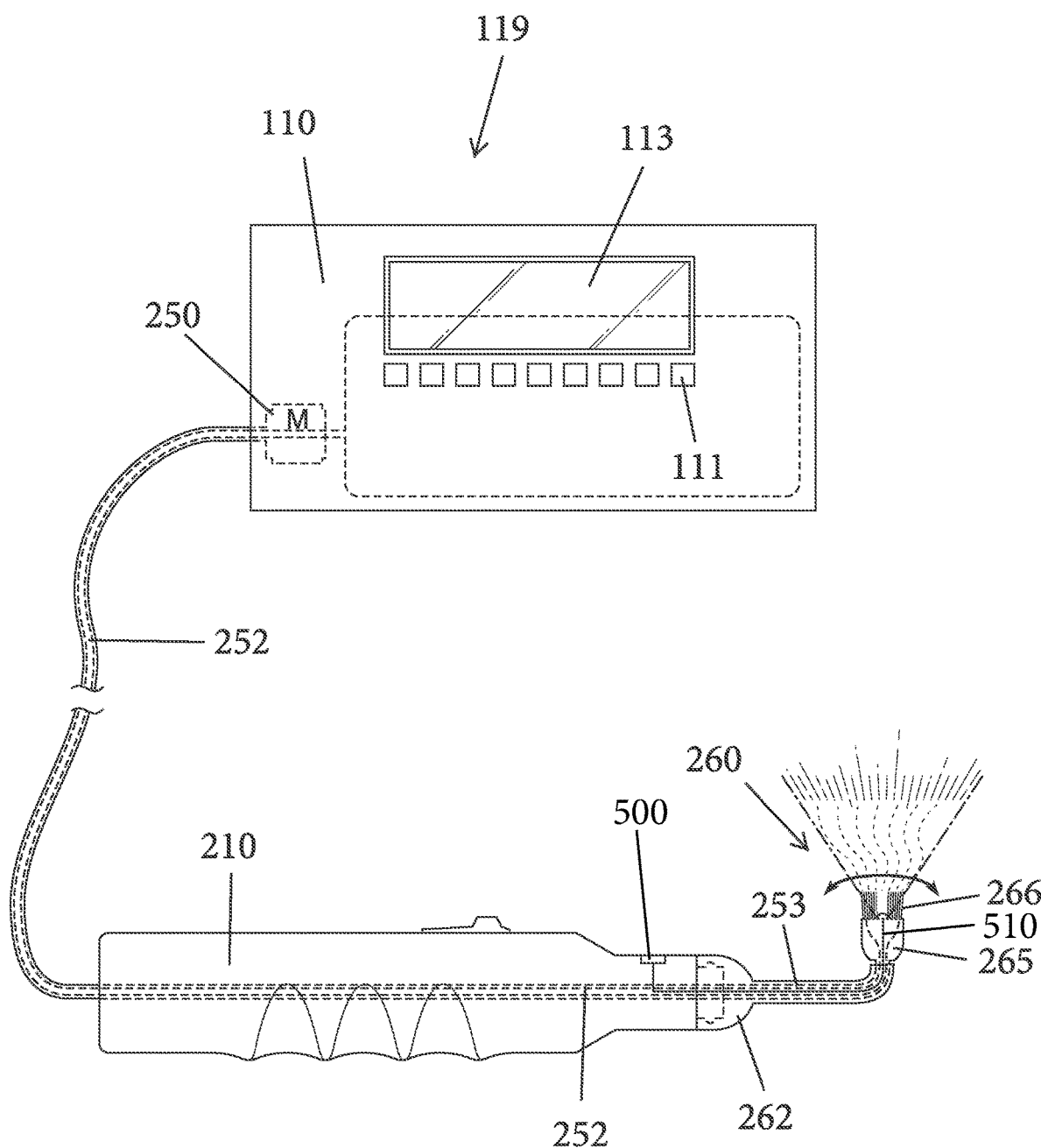
FIG. 14 illustrates the system of FIG. 2 further including an optional illumination feature.

Light Source for Visualization/Sterilization (FIGS. 13 and 14)

In yet another aspect of one or more of the systems disclosed herein, an aiming beam and/or disinfecting feature can be incorporated into the design of the present system. As mentioned, the surgical brush 200 is intended in some settings for use during the surgical procedure after implantation of the surgical device. In other words, the surgical brush 200 can be used within the body to contact the surgical device (e.g., an implant) and therefore, it may be desirable to have an aiming light that directs light to the site (surface(s)) where the surgical brush 200 will be used. As shown in FIGS. 13 and 14, the aiming light can be forward projected beam of light that illuminates the surgical site. In one embodiment, the axis of the aiming light is parallel to the axes of the bristles. In other words, the aiming light is directed immediately forward of the bristles.

The aiming light includes, as shown in FIG. 13, a light source 500 as well as a light conduit 510 that is operatively coupled to the light source 500 at one end and an opposite end is the open end through which the illuminating light is projected. In one embodiment, the light source 500 is a visible light source that is contained within the hand-held housing and the light conduit 510 can comprise a fiber optic or light carrying structure (tube). The light source 500 can be operated by a separate actuator, such as a separate switch along the handle, or it can be configured such that when the motor of the surgical brush is actuated, as by using the main controller (main actuator), the aiming light can automatically turn on. In other words, anytime the motor is operated, the aiming light will turn on.

In FIGS. 13 and 14, the projected light is depicted by dot-dash lines.

The light conduit 510 can be of a type that is bendable, such as a fiber optic. As shown in FIG. 14, the aiming light feature can be incorporated with the different detachable brush types disclosed herein. In the event that the surgical brush is detachable from the main hand-held handle unit, the aiming light feature can be located both within the main hand-held handle unit and the detachable surgical brush. For example, the light source can be located in the hand-held handle unit and the light conduit is located within the detachable surgical brush. It can also be configured such that a first light conduit segment is located in the hand-held handle unit and a second light conduit segment is located in the surgical brush and oriented so that light passes through the first light conduit segment to the second light conduit segment and then exits.

FIG. 14 shows the use of the aiming light feature in the right angle surgical brush.

In another embodiment, the light source 500 can be a UV light source that projects UV light onto the surgical site to facilitate in disinfection of this surgical site that is being cleaned with the surgical brush.

Since the surgical brush moves under operation of the motor, the light conduit is designed to accommodate such movement.

Thus, in one embodiment, the distal connector may also have a small aperture on the distal end from which a light source may be placed, adjacent to the brush to illuminate the surgical wound to permit better visualization of surfaces or tissue that require cleaning.

There can also be a separate distal attachment from which a dedicated light source (no surgical brush) is present which emits ultraviolet light (wavelengths within 200-300 nanometers) which can be specifically focused on surfaces of interest which may be difficult to access with the brush, or may be of specific concern for heavy contamination. Wavelengths within this range have been shown to be germicidal and therefore their application can be useful in removing any viable bacteria that may still be present.

Smart Connection

In another embodiment, the system 100 is designed so that the system 100 can detect which particular head portion 220 is attached to the handle housing. For example, the handle housing can have a reader 205, such as an optical reader, that is configured to detect and determine which head portion 220 is attached to the handle housing. Each of the head portions 220 can include a unique identification code, such as a unique optical code 207 printed on an inner surface of the neck of the head, that is read by the reader in the base handle when the head portion 220 is attached to the base handle.

By being able to determine which head portion 220 is attached to the base handle 210, the system 100 can then revert to default settings for that particular head portion 220. For example, there can be a database that is stored in memory that can be located in the console 110 along with a processor and the database contains default operating settings for each head portion 220. For example, certain heads can be purposely constructed for use only on medical devices, such as an implant, and not on soft tissue and therefore, the default settings for this head can be both the high oscillation setting and the high irrigation setting. Conversely, for certain head portions 220 that are purposely constructed for use only on soft tissue, the default settings for this type of head can be both the low oscillation setting and the low irrigation setting.

By having automatic detection of the head type, the user does not have to remember to select the appropriate settings. Instead, the smart surgical brush defaults automatically to the default settings for the particular surgical brush that is installed on the base handle.

While optical recognition is one technique for determining which head portion 220 is installed on the base handle 210, there are other alternative techniques that can be equally used to determine the identity of the head portion 220 that is attached to the base handle 210.

Alternative Systems

FIG. 2 illustrates another system 109 that is similar to system 100 and therefore, like elements are numbered alike.

The main different is that in system 109, the brush head has a 90 degree construction in that the movable bristle portion is oriented 90 degrees relative to the longitudinal axis of the body 222 of the brush head.

The motor 215 is connected to the movable bristle plate 235 by means of a linkage that converts the rotary motion of the drive shaft of the motor 215 first into a back-and-forth motion of a main linkage 217 that is located inside the body 222. At the distal end of the main linkage 217, there is a gear or other transmission part, generally identified at 218, that is directly connected to the movable bristle plate 235. The back-and-forth motion (left-to-right in FIG. 2) is translated into rotation or semi-rotation of the bristle plate 235 by means of the transmission part 218 (which can be configured to either fully rotate the bristle plate 235 or semi-rotate (oscillate)).

The system 109 includes an irrigation feature in the form of an irrigation channel that passes through the handle to the bristle plate 235. A motor 250 can be provided in the console 110.

FIG. 3 is another alternative system 119 that is similar to the system 100, 109 and therefore, like elements are numbered alike.

In the system 119, a motor 250 can be located in the console 110 and is operatively connected to a first flexible drive shaft (snake) 252 that is located inside a protective jacket that remains stationary and fixed in place. The first flexible drive shaft 252 is also hollow and therefore, an irrigation fluid can be carried through the center thereof. The first flexible drive shaft 252 is routed through the handle 210.

The first flexible drive shaft 252 can terminate a distal end.

A detachable brush head 260 is provided and includes a body 262 and a movable bristle plate 265 from which bristles 266 extend. Within the body 262, there can be a second flexible drive shaft 253 that is designed to be coupled to the first flexible drive shaft 252 resulting in the two flexible shafts 252, 253 rotating in unison under action of the motor 250. A suitable connector can be used to couple the two shafts 252, 253. For example, the proximal end of the second flexible drive shaft 252 can contain a hollow connector that receives the distal end of the first flexible drive shaft 250, thereby coupling the two together in a friction fit. The distal end of the second flexible drive shaft 252 is connected to the movable bristle plate 265 and therefore, the rotation of the flexible drive shaft is directly translated into a corresponding movement of the bristle plate 265. Thus, if the flexible drive shaft 252, 253 is rotated 360 degrees as by user selection at the console 110 or the handle 210, the bristle plate 235 likewise rotates 360 degrees. Conversely, if the flexible drive shaft 252, 253 moves in a semi-rotational manner, the bristle plate 265 will likewise move in a semi-rotational manner Different Brush Head Designs It will be understood that the bristles 240 that form part of the brush head can be formed of a polymeric (e.g. nylon) material. In the event that the bristles are intended for cleaning of soft tissue or the like, the bristles will be formed to have a softer feel and be longer in length. Conversely, when the bristles are intended for cleaning of a hard, rigid object, such as the implant, the bristles are formed to have a coarser feel and be shorter in length.

First Brush Head (Straight Brush Head) (FIG. 4A)

FIG. 4A shows a first brush head 300 that is configured for use with cleaning a hard, rigid object, such as an implant. The first brush head 300 has no angle of inclination and therefore, can be referred to as a 0 degree brush head. The first brush head 300 has a movable bristle plate 302 that moves relative to a neck portion 304 of the first brush head 300. Bristles 305 are disposed along axes that are parallel to the longitudinal axis of the first brush head 300 and the handle for that matter.

The bristle plate 302 can be configured to fully rotate (360 degree rotation) or semi rotate (oscillate).

Since the illustrated first brush head 300 is intended for use with cleaning of a hard, rigid object, the bristles 305 are selected in view of this intended use and are thus in the form of shorter, more rigid bristles.

To accommodate irrigation, the first brush head 300 includes an inner lumen 301 through which irrigation flows to the exposed surface of the bristle plate 302.

Second Brush Head (Fixed 90 Degree Brush Head) (FIG. 4B)

FIG. 4B shows a second brush head 310 that is configured for use with cleaning a hard, rigid object, such as an implant. The second brush head 310 has a 90 degree angle of inclination in that the second brush head 310 has a 90 degree bend along its length. The second brush head 310 has a movable bristle plate 312 that moves relative to a neck portion 314 of the second brush head 310. The 90 degree bend in the neck portion is close to the distal end of the second brush head 310 so as to position the bristle plate 312 off axis.

The bristle plate 312 can be configured to fully rotate (360 degree rotation) or semi rotate (oscillate).

Since the illustrated second brush head 310 is intended for use with cleaning of a hard, rigid object, the bristles 315 are selected in view of this intended use and are thus in the form of shorter, more rigid bristles.

Irrigation lumen 301 is provided.

Figures 4C, 4D, 4E:
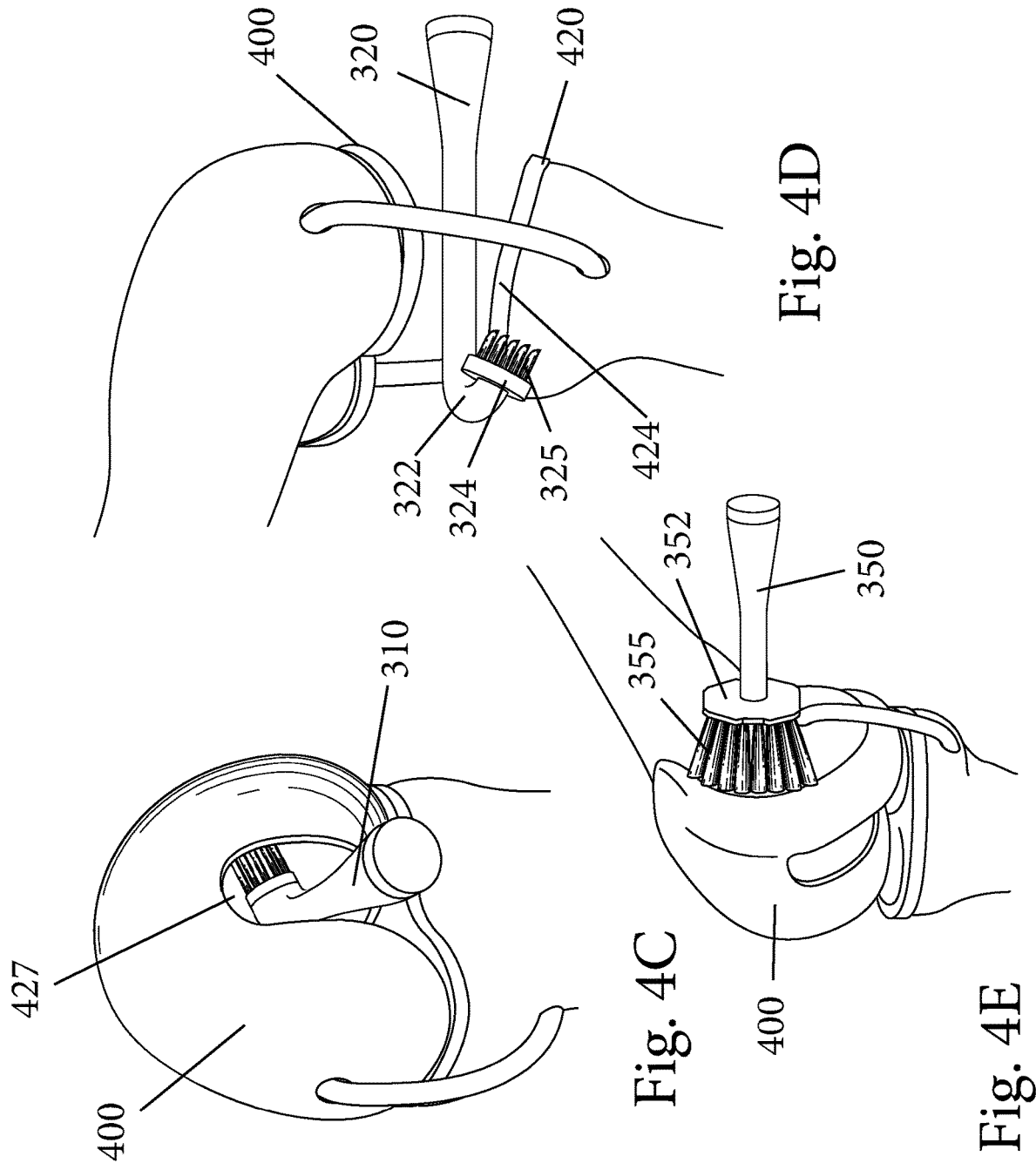

Third Brush Head (Reverse Brush Head) (FIG. 4D)

FIG. 4D shows a third brush head 320 that is configured for use with cleaning a hard, rigid object, such as an implant. The third brush head 320 has a reverse construction in that the neck portion 322 is bent such that a movable bristle plate 324 faces rearward toward the proximal end of the third brush head 320 that is attached to the handle. In this construction, the third brush head 320 has a hook shape. As shown in FIG. 4D, the angle between the bent neck and the main straight shaft portion of the brush head 320 is less than 90 degrees and can be 45 degrees which causes the bristles to be oriented rearward toward the main straight shaft portion. This reverse orientation of the brush head yields a structure that has a hook like shape.

The bristle plate 324 can be configured to fully rotate (360 degree rotation) or semi rotate (oscillate).

Since the illustrated third brush head 320 is intended for use with cleaning of a hard, rigid object, bristles 325 are selected in view of this intended use and are thus in the form of shorter, more rigid bristles.

Inner irrigation lumen, like lumen 301, can be provided.

Figure 6:
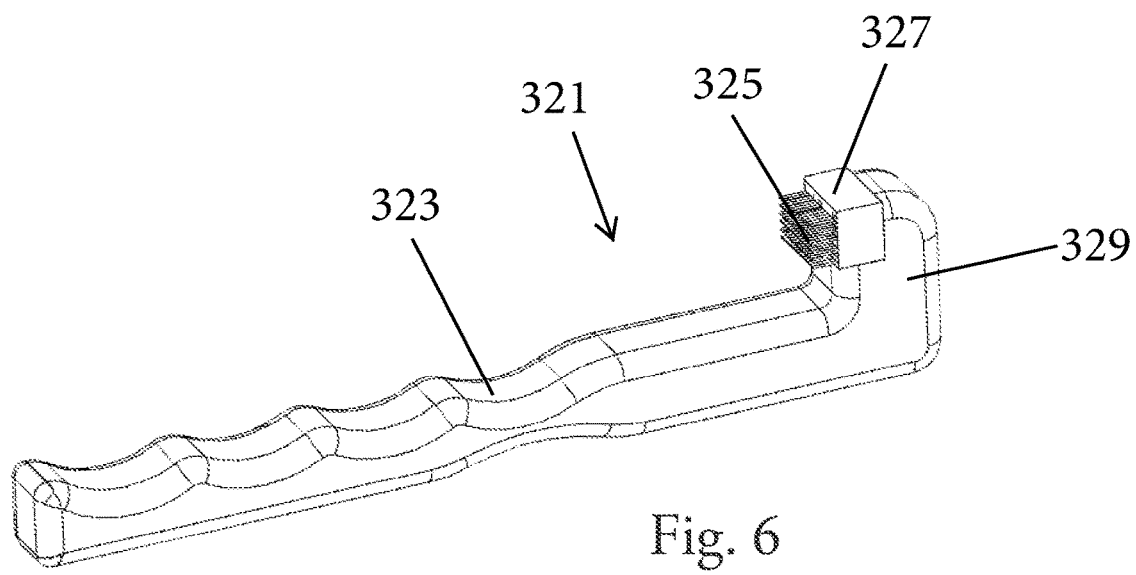
FIG. 6 is a side perspective view of a reverse or hook type brush head.

FIG. 6 illustrates another reverse brush head 321 that includes a main shaft 323 and a distal neck 329 that leads to a bristle plate 327 that includes the bristles 325. Like brush head 320, the brush head 321 has a reverse design; however, in this embodiment, the bristle plate 327 and bristles 325 are oriented along an axis that is parallel to a longitudinal axis of the main shaft 323. The distal neck 329 can thus be formed at a 90 degree angle relative to the main shaft 323 and the bristle plate 327.

It will be appreciated that the reverse brush head 321 can be constructed so as to connectable to the motorized handle as described herein to cause automated movement of the brush head.

Figure 5A:
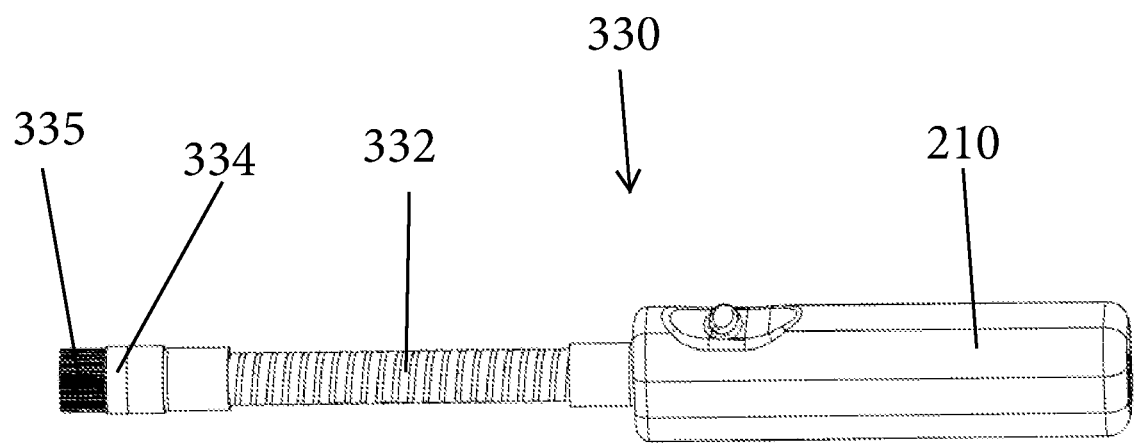
FIG. 5A is a side elevation view of a gooseneck type brush head in a linear state.
Figure 5B:
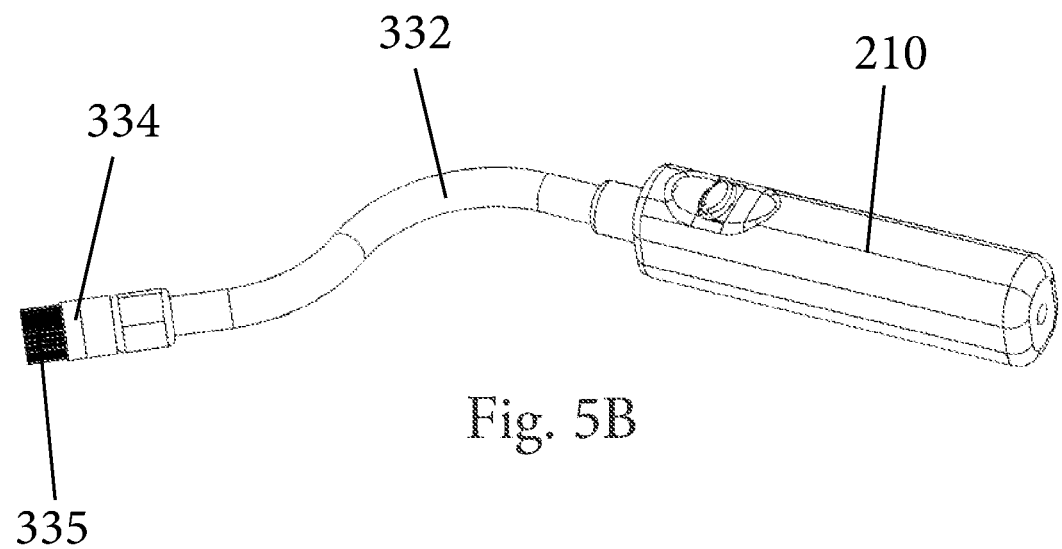
FIG. 5B is a side perspective view of the gooseneck type brush head in a bent state.

Fourth Brush Head (Adjustable (Bendable) Brush Head) (FIGS. 5A and 5B)

FIGS. 5A and 5B illustrate a fourth brush head 330 that is designed to be freely bendable and is configured to maintain its bent shape after it is bent. Such construction is commonly known as a gooseneck construction in that it is a flexible jointed article. The gooseneck portion of the brush head 330 can be in the form of a flexible gooseneck hose tube. In such construction, the inside of the gooseneck is actually a spring which can be made of a high-carbon steel or stainless steel. This is what gives the gooseneck it's strength and flexibility. Then a soft galvanized iron wire is wrapped and compressed into the gaps of the spring coil (stainless steel or brass can also be used). The friction between these two wires is what gives the gooseneck it's ability to stay in position after it is bent.

The fourth brush head 330 has an adjustable neck 332 that can be formed of any number of different materials that are able to be bent and then subsequently hold the bent shape. For example, the adjustable neck 332 can be formed of a memory material that maintains its shape once it is bent to a selected position or it can be formed having a gooseneck construction as discussed above. As with the other surgical brushes, the fourth brush head 330 has a movable bristle plate 334 that includes the bristles 335. In one embodiment, the bristles 335 are of a type that are suited for cleaning of a rigid object (e.g., an implant) and therefore are rigid and can have a short length compared to the bristles that are more suited for use with cleaning soft tissue.

The adjustable neck 332 thus allows the bristle plate 334 and the bristles 335 to be positioned at a desired configuration (orientation). For example, in order to reach a tight corner of one of the parts of the implant, the neck 332 is bent to allow the bristle plate 334 and bristles 335 to be placed at an attack angle that allows the bristles 335 to contact the target surface that is to be cleaned.

The bendable neck 332 thus allows the bristle plate 334 to be placed at a 90 degree angle or other angle, such as a 45 or 60 degree angle.

The adjustable neck 332 can be formed of a memory material in one embodiment. The adjustable neck 332 can alternatively be formed of multiple parts that are coupled to one another in bendable manner. For example, each part can be a frustoconical shaped part that is coupled to another part (gooseneck construction).

In addition, the neck 332 includes an irrigation conduit, such as the conduit 301 shown with respect to other embodiments, that opens at the bristle plate 334 for dispensing of the irrigation fluid. Since the neck 332 is freely bendable, the irrigation conduit accommodates such bending action. The irrigation conduit can be a bore (passageway) formed in the neck 332 or it can be a separate structure such as a tube or the like that is routed through the neck 332.

FIG. 5A shows the surgical brush head 330 in an initial straight state and FIG. 5B shows the surgical brush head 330 in a bent state. It will be appreciated that the neck 332 can be bent to have a complex shape defined by at least two different bent sections that are bent in different directions.

It will also be appreciated that the brush head 330, as well as the other ones described and illustrated herein, can include the optional illumination conduit that is described and illustrated in FIGS. 13 and 14. In the brush head 330, the open end of the illumination conduit will be located within the bristles or at a perimeter edge of the bristle plate and is configured to accommodate the bending action of the neck 332.

As mentioned above, while the surgical brush head 330 is particularly suited for use in cleaning an implant or similar hard, rigid object, the bristles 335 can be of a type that is suitable for the soft tissue.

Figure 12:
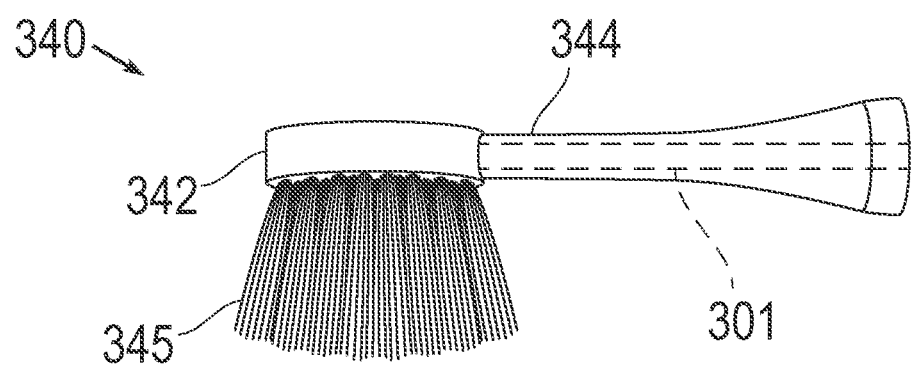
FIG. 12 is side elevation view of another type of brush head.

Fifth Brush Head (Fixed 90 Degree Brush Head) (FIG. 12)

FIG. 12 shows a fifth brush head 340 that is configured for use with cleaning a hard, rigid object, such as an implant. The fifth brush head 340 has a 90 degree angle of inclination in that the fifth brush head 340 has a 90 degree bend along its length. The fifth brush head 340 has a movable bristle plate 342 that moves relative to a neck portion 344 of the fifth brush head 340. The 90 degree bend in the neck portion is close to the distal end of the fifth brush head 340 so as to position the bristle plate 342 off axis.

The bristle plate 342 can be configured to fully rotate (360 degree rotation) or semi rotate (oscillate).

Since the illustrated fifth brush head 340 is intended for use with cleaning of soft tissue, the bristles 345 are selected in view of this intended use and are thus in the form of longer, softer and more flexible bristles.

Sixth Brush Head (Fixed 0 Degree Brush Head) (FIG. 4E)

FIG. 4E shows a sixth brush head 350 that is configured for use with cleaning a hard, rigid object, such as an implant. The sixth brush head 350 has a 0 degree angle of inclination in that the sixth brush head 350 has no bend along its length. The sixth brush head 350 has a movable bristle plate 352 that moves relative to a neck portion (main shaft) of the sixth brush head 350. The 90 degree bend in the neck portion is close to the distal end of the sixth brush head 350 so as to position the bristle plate 352 off axis.

The bristle plate 352 can be configured to fully rotate (360 degree rotation) or semi rotate (oscillate).

Since the illustrated sixth brush head 350 is intended for use with cleaning of soft tissue, the bristles 355 are selected in view of this intended use and are thus in the form of longer, softer and more flexible bristles.

Figure 7:
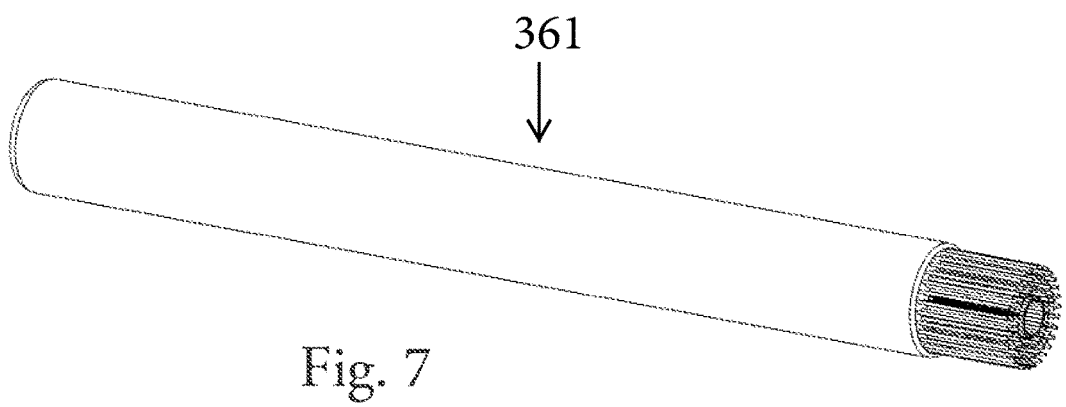
FIG. 7 is a side perspective view of an increased length brush head.
Figure 8:
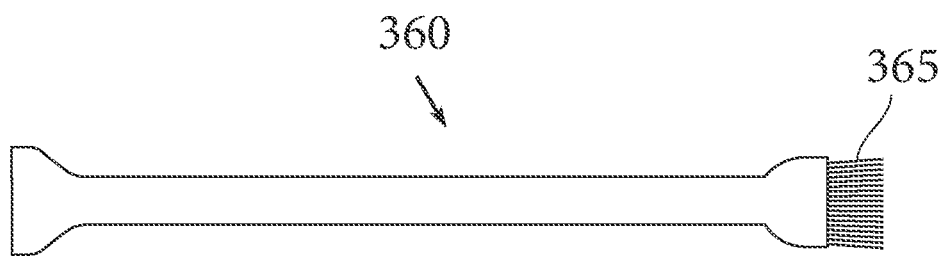
FIG. 8 is a side elevation view of another type of brush head.

Seventh and Eighth Brush Heads (Fixed 0 Degree Brush Head) (FIGS. 7 and 8)

FIGS. 7 and 8 shows a seventh brush head 360 and an eighth brush head 361, each of which is configured for long reach applications, such as arthroscopy and endoscopy. The brush heads 360, 361 have a 0 degree angle of inclination in that they both have no bend. The shaft constructions differ between the two brush heads as shown.

Figure 9:
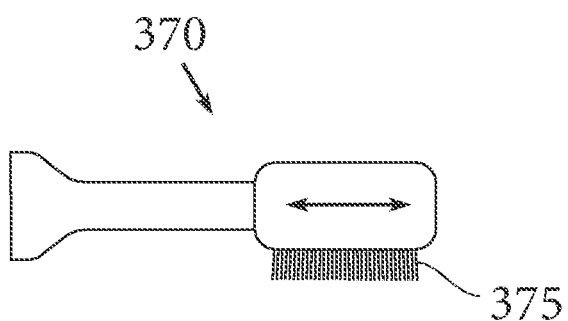
FIG. 9 is a side elevation view of another type of brush head.

Ninth Brush Head (FIG. 9)

FIG. 9 shows a ninth brush head 370 that is configured for back-and-forth movement, as indicated by the arrows (a saw-like action). This motion is along the longitudinal axis of the handle and the brush head. Bristles 375 are formed along one side (face) of the brush head 370.

Figure 10:
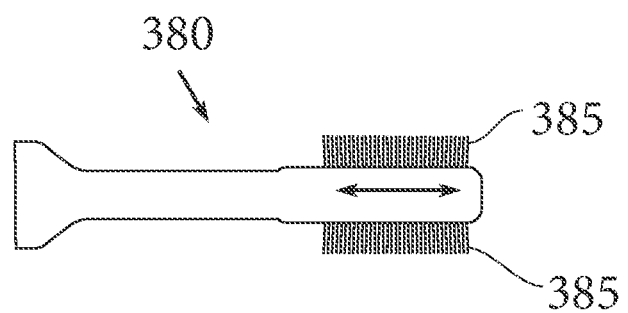
FIG. 10 is a side elevation view of another type of brush head.

Tenth Brush Head (FIG. 10)

FIG. 10 shows a ninth brush head 380 that is configured for back-and-forth movement, as indicated by the arrows (a saw-like action). This motion is along the longitudinal axis of the handle and the brush head. Bristles 385 are formed along opposing sides (two faces) of the brush head 380.

Figure 11:
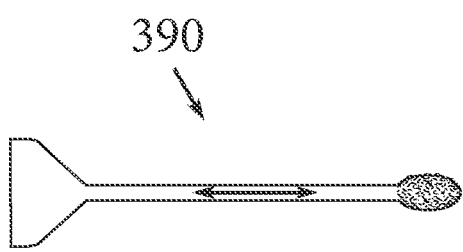
FIG. 11 is a side elevation view of another type of brush head.

Eleventh Brush Head (FIG. 11)

FIG. 11 illustrates an eleventh brush head 390 that can be resemble a Q-tip® (cotton swab) structure. This type of structure can be used in tight corners and difficult surfaces to access along either the medical device (e.g., implant) or soft tissue areas.

It will be appreciated that any of the surgical brushes described and illustrated herein (e.g., those shown in FIGS. 4A to 12) can be used with the motorized hand-held unit described and illustrated herein or alternatively, can be provided as a non-motorized brush that can be hand-held by the user (surgeon). In other words, the shafts of the brush heads can be sized so as to be hand-held by the user who manually brushes the surface of interest.

Exemplary Orthopedic Application—Knee Implant (FIGS. 4A-4E)

FIGS. 4A-4E illustrate one exemplary orthopedic implant. One of the challenges in cleaning a medical device, such as the orthopedic implant, is that it includes many angled surfaces and there are corners and shoulders that are difficult to access with traditional cleaning instruments, like brushes, etc.

As is known, a traditional knee replacement includes a femoral component 400 that is designed to be share the same shape and contour of the distal portion of a femur. The femoral component 400 has a flat articulating surface 410 as well as convex surfaces along the edges and a notched, concave surface in the middle. The other metal portion of a knee replacement is a tibial component 420. The tibial component 420 includes a flat tray that resides in the joint space as well as a stem and keel portion that resides in the tibial intramedullary canal 422. Extending upwards from the flat articulating tray is a complex locking mechanism involving protruding edges and recessed inner surfaces 422. The purpose of the complex locking mechanism is to house a high density polyethylene insert that articulates with the femoral component 422. A second articulating surface is complementary to the first articulating surface 410 with these two surfaces contacting one another to permit articulation of the knee implant.

The kit of brush heads advantageously provides the user with a selection of brush heads that can be used to navigate around the complex shapes of the knee implant and clean every exposed surface within the knee joint. FIGS. 4A-4E illustrate exemplary surfaces that are cleaned using the plurality of brush heads.

In FIG. 4A, first brush head 300 and/or the third brush head 320 can be used to clean the side and bottom surfaces (including the first articulating surface 410) of the femoral component. Since the first brush head 300 has a 0 degree construction, the bristles face directly forward and contact these outer surfaces of the femoral component 400.

In FIG. 4B, the second brush head 310 is shown for use on the floor of the tibial tray 422. In FIG. 4B, the tibial insert is not shown. For cleaning of this area, the second brush head 310 can be used. The right angle nature of the second brush head 310 permits not only the floor of the tibial tray 422 to be cleaned but also permits the right angle shoulder formed between the peripheral edge (lip) 424 and the floor of the tibial tray 422. The second brush head 310 can thus be used to clean the inner surfaces of the peripheral edge 424.

In FIG. 4C, the second brush head 310 is shown for cleaning the condylar portions of the femoral component 400 and for cleaning the intercondylar space 427. The 90 degree angle of the second brush head 310 allows for insertion into the intercondylar space 427 and for cleaning of the inner regions of the condylar portions.

In FIG. 4D, the fourth brush head 330 is shown for cleaning the outer surface of the peripheral edge 424 of the tibial component. The adjustability of the neck portion of the fourth brush head 330 allows the fourth brush head 330 to be bent into a desired orientation for cleaning of the hard, rigid surface, in this case the tibial tray of the tibial component.

In FIG. 4E, the sixth brush head 350 is shown for cleaning the surgical site and more particularly, for cleaning soft tissue, bone, muscle, etc. It will be appreciated that the fifth brush head 340 can be used instead or used in combination with the sixth brush head 350 in the step illustrated in FIG. 4E. In FIG. 4E, the sixth brush head 350 is shown be used on the femoral component 400. While the applications of the present catheter devices are discussed in terms of being used in intravenous access, it will be appreciated that the present devices can be used in other applications. For example, the present devices can be used in other kinds of vascular access (intra-arterial) or other procedures where it might be useful to move from a sharp to a blunt tip, such as peripheral nerve blocks or neuraxial procedures.

In addition, while the various brush heads are discussed as being detachable from the handle, it will be appreciated that any of the surgical brush devices described herein can be formed such that the brush head is fixedly attached to the handle. In this case, there can be a plurality of different hand-held surgical devices that can be stored in a kit and are available to the surgeon.

It is to be understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A powered hand-held device for cleaning bacteria and biofilm from
a surface of an implantable medical device comprising:
a handle having a distal end;
a brush head that is detachably coupled to the distal end of the handle, the brush head having a movable bristle plate from which a plurality of bristles extend outwardly;
wherein the hand-held device has at least two operating modes including an oscillation operating mode and a sonication operating mode, each of the oscillation operating mode and the sonication operating mode having a plurality of different operating speeds, wherein in the oscillation operating mode, the movable bristle plate oscillates between 7,000 to 36,000 movements per minute and wherein in the sonication operating mode, the movable bristle plate vibrates to generate high frequency waves between 20 kHz and 20 MHZ;
an irrigation conduit formed through the handle and the brush head, the irrigation conduit terminating in a dispensing outlet formed along an exposed surface of the movable bristle plate;
wherein in the oscillation operating mode, irrigation fluid is dispensed through the irrigation conduit at a first pressure and wherein in the sonication operating mode, irrigation fluid is dispensed through the irrigation conduit at a second pressure that is less than the first pressure.

2. The hand-held device of claim 1, wherein the oscillation operating mode has a first speed between 7000-12,000 movements per minute; a second speed between 12,000-24,000 movements per minute; and a third speed between 24,000-36,000 movements per minute.

3. The hand-held device of claim 1, wherein the sonication operating mode has a first speed that generates high frequency waves of between 20-200 kHz; a second speed that generates high frequency waves of between 200 kHz-11 MHz; and a third speed that generates high frequency waves of between 11-20 MHz.

4. The hand-held device of claim 1, further including a first actuator located along the handle, the first actuator being configured to select between the oscillation and sonication operating modes and a second actuator that is configured to select between the plurality of different operating speeds.

5. The hand-held device of claim 1, wherein the first pressure comprises a pressure of at least 30 psi and wherein the second pressure comprises a pressure of 15 psi or lower.

6. The hand-held device of claim 1, wherein the brush head has an adjustable neck portion that can be bent into and can hold a plurality of different bent positions.

7. The hand-held device of claim 6, wherein the movable bristle plate and the plurality of bristles are located at a distal end of the adjustable neck portion and wherein a longitudinal axis of the plurality of bristles is parallel to a longitudinal axis of the adjustable neck portion when the adjustable neck portion is in a straight configuration and is coaxial to a longitudinal axis of the handle.

8. The hand-held device of claim 6, wherein the adjustable neck portion can be bent in two different directions so as to define at least two bent segments along a length of the adjustable neck portion.

9. The hand-held device of claim 1,
wherein the brush head has a main shaft that terminates in a bent neck that defines a distal end of the brush head and has a fixed hook shaped construction with the movable bristle plate in that the bent neck extends in a proximal direction from the distal end to the movable bristle plate and the plurality of bristles located along movable bristle plate facing rearwards towards a proximal end of the shaft, the movable bristle plate and plurality of bristles being entirely spaced from the distal end defined by the bent neck.

10. The hand-held device of claim 9, wherein the brush head is J-shaped.

11. The hand-held device of claim 1, further including a light source and a light conduit that projects light forward toward the plurality of bristles.

12. The hand-held device of claim 11, wherein the light conduit comprises a fiber optic that is open along a neck portion of the brush head at a location rearward of the movable bristle plate.

13. The hand-held device of claim 11, wherein the light conduit comprises a fiber optic that is open along the movable bristle plate of the brush head.

14. The hand-held device of claim 11, wherein the light source comprises UV light.

15. The hand-held device of claim 1, wherein the medical device comprises a metal implant.

16. The hand-held device of claim 1, wherein the distal end of the handle includes a reader and the brush head has a unique identifier that is readable by the reader for uniquely identifying the brush head that is coupled to the handle.

17. The hand-held device of claim 16, wherein the reader is an optical reader and the unique identifier comprises a visual mark.

18. The hand-held device of claim 16, further including a main controller that is operatively connected to the reader, the main controller being configured to select or propose to a user one of the oscillation operating mode and the sonication operating mode.

19. The hand-held device of claim 1, wherein the plurality of bristles are formed in a bundle and are configured for cleaning the surface which is part of a medical device, the plurality of bristles being oriented along an axis that is coaxial with a longitudinal axis of the brush head.

20. The hand-held device of claim 1, wherein the hand-held device has a further pulse operation mode in which the irrigation fluid is delivered in a pulsed manner and during an off cycle of irrigation fluid delivery, negative pressure is applied for aspirating the irrigation fluid.

21. A kit for cleaning bacteria and biofilm from both a surface of a medical device and soft tissue at a surgical site comprising:

a powered handle having a distal end, wherein the powered handle has an oscillation operating mode and a sonication operating mode; and a plurality of brush heads each of which is configured to be detachably coupled to the distal end of the handle, the plurality of brush heads including a first brush head that includes first bristles and a second brush head that includes second bristles;

wherein the first brush head includes a movable first bristle plate from which the first bristles extend and a bendable neck portion that can be bent into and can hold a plurality of different bent positions;

an irrigation conduit formed through the handle and the brush head, the irrigation conduit terminating in a dispensing outlet formed along an exposed surface of the movable bristle plate;

wherein in the oscillation operating mode, irrigation fluid is dispensed through the irrigation conduit at a first pressure and wherein in the sonication operating mode, irrigation fluid is dispensed through the irrigation conduit at a second pressure that is less than the first pressure.

22. The kit of claim 21, wherein the movable first bristle plate and the first bristles are located at a distal end of the bendable neck portion and wherein a longitudinal axis of the plurality of bristles is parallel to a longitudinal axis of the adjustable neck portion when the bendable neck portion is in a straight configuration and is coaxial to a longitudinal axis of the powered handle.

23. The kit of claim 22, wherein the bendable neck portion can be bent in two different directions so as to define at least two bent segments along a length of the bendable neck portion.

24. The kit of claim 21, wherein the first bristle plate rotates or partially rotates.

25. The kit of claim 21, wherein the distal end of the handle includes a reader and each of the brush heads has a unique identifier that is readable by the reader for uniquely identifying the brush head that is connected to the handle.

26. The kit of claim 25, wherein the reader is an optical reader and the unique identifier comprises a visual mark.

27. The kit of claim 21, wherein each of the oscillation operating mode and the sonication operating mode has a plurality of different operating speeds, wherein in the oscillation operating mode, the movable bristle plate oscillates between 7,000 to 36,000 movements per minute and wherein in the sonication operating mode, the movable bristle plate vibrates to generate high frequency waves between 20 kHz and 20 MHZ.

28. The kit of claim 21, wherein the second brush head has a main shaft and a fixed hook shaped construction with a movable bristle plate and the second bristles facing rearwards towards a proximal end of the main shaft.

29. The kit of claim 28, wherein the second brush head is J-shaped.

30. The kit of claim 21, wherein the powered handle includes a light source and at least one of the first brush head and the second brush head includes a light conduit that projects light forward toward one of the first and second bristles, respectively.

31. The kit of claim 30, wherein the light conduit comprises a fiber optic that is open along a neck portion of one of the first and second brush heads at a location rearward of a movable bristle plate associated with the one of the first and second brush heads.

32. The kit of claim 30 wherein the light conduit comprises a fiber optic that is open along a movable bristle plate of the one of the first and second brush heads.

\* \* \* \* \*